United States Patent [19]

Negishi

[11] Patent Number: 5,001,341

[45] Date of Patent: Mar. 19, 1991

[54] HORIZONTAL SYNC SIGNAL GENERATING DEVICE FOR USE IN OPTICAL PRINTER

[75] Inventor: Kiyoshi Negishi, Saitama, Japan

[73] Assignee: Asahi Kogaku Kogyo Kabushiki Kaisha, Tokyo, Japan

[21] Appl. No.: 83,373

[22] Filed: Aug. 10, 1987

[30] Foreign Application Priority Data

Aug. 12, 1986 [JP] Japan ................. 61-189324

[51] Int. Cl.$^5$ .................................... H01J 3/14
[52] U.S. Cl. ..................... 250/235; 358/481
[58] Field of Search ............... 250/236, 235; 350/6.8, 350/6.7; 358/296, 300, 302, 481; 346/108

[56] References Cited

U.S. PATENT DOCUMENTS

| | | | |
|---|---|---|---|
| 4,190,867 | 2/1980 | Ohnishi | 358/296 |
| 4,201,994 | 5/1980 | Hoshito et al. | 358/481 |
| 4,350,988 | 9/1982 | Masegi | 250/236 |
| 4,369,365 | 1/1983 | Bedford et al. | 250/236 |
| 4,379,631 | 4/1983 | Kitamura | 355/14 R |
| 4,429,218 | 1/1984 | Thomas | 250/236 |
| 4,553,173 | 11/1985 | Kawamura | 358/283 |
| 4,566,547 | 1/1986 | Furukawa | 355/14 SH |
| 4,591,903 | 5/1986 | Kawamura et al. | 358/75 |
| 4,592,984 | 6/1986 | Nishigaki | 430/59 |
| 4,597,018 | 6/1986 | Sonobe et al. | 358/296 |
| 4,663,523 | 5/1987 | Swanberg | 250/235 |
| 4,673,811 | 6/1987 | Looschen | 250/235 |
| 4,675,908 | 6/1987 | Saito et al. | 382/41 |
| 4,722,581 | 2/1988 | Hamada et al. | 350/6.8 |

FOREIGN PATENT DOCUMENTS 58-103602 6/1983 Japan.
59-79217 5/1984 Japan.
59-134977 8/1984 Japan.

Primary Examiner—David C. Nelms
Assistant Examiner—Michael Messinger
Attorney, Agent, or Firm—Sandler, Greenblum & Bernstein

[57] ABSTRACT

A horizontal sync signal generating device for use with an optical printer to determine the starting positions of horizontal scannings on a photoconductive member for forming images thereon. The generation of horizontal sync timing signals is kept constant regardless of any difference in the characteristics of a light beam transmitted via each scanning face of a polygonal rotary member.

5 Claims, 6 Drawing Sheets

| PROPER TIMING OF THE HORIZONTAL SYNCHRONIZATION SIGNAL (HL) | 1 ⊔ | 2 ⊔ | 3 ⊔ | 4 ⊔ | 5 ⊔ | 6 ⊔ |

THE OUTPUT FROM THE D/A CONVERTER 26: Vbck, Vcmp1, Vcmp2, Vcmp3, Vcmp4, Vcmp5, Vcmp6, Vbck

HORIZONTAL SYNC SIGNAL GENERATING DEVICE FOR USE IN OPTICAL PRINTER

BACKGROUND OF THE INVENTION

This invention relates to an optical printer, such as a laser beam printer, and more particularly to a horizontal sync signal generating device for synchronizing the horizontal scanning starting positions of an optical beam, such as a laser beam.

The fundamental structure of the laser beam printer (hereinafter referred to "LBP") is as illustrated in FIG. 6, wherein a laser beam projected from a semiconductor laser 11 and containing image data, such as graphics and characters, is directed to a rotatably driven polygonal mirror 12 via a collimator lens 16 and a cylindrical lens 17 and is reflected on its reflection planes 12a through 12f. The reflections are radiated onto a photoconductive drum 13. Located between the polygonal rotary mirror 12 and the photoconductive drum 13 is a fθ lens 14 which makes constant a horizontal scanning speed of the laser beam on the drum 13. While horizontal scannings are carried out by the reflection planes of the polygonal mirror 12, the photoconductive drum 13 is rotated at a predetermined speed in a vertical scanning direction perpendicular to the horizontal scanning direction. Thus, latent images of entire video signals are formed on the photoconductive drum 13. The latent images are then developed on paper using conventional copy machine technology.

In the LBP as described above, an individual horizontal scanning start position, that is, printing start point of the latent image formed on the photoconductive drum 13, must be synchronized to be brought into alignment with one another in the vertical scanning direction. For this purpose, a photodetector 15 is located on one side of the drum 13 where the laser beam is admitted with rotation of the polygonal mirror 12 without affecting formation of the latent images. Horizontal synchronization can be obtained by setting the scanning start positions on the drum 13 based upon the incidence of the laser beam onto the photodetector 15.

FIG. 7 shows a conventional horizontal sync signal generating device using the above photodetector 15. When the beam enters the photodetector 15 (which comprises a photodiode PD), the electric current ip which depends on the quantity of the received light that flows through transistor TR1 and load resistor RL. The voltage across the load resistor RL is compared with a reference voltage Vref in a comparator C. A horizontal sync signal HL (pulse) is then outputted when the voltage across the load resistor RL exceeds the reference voltage Vref.

Assuming that the reference voltage Vref is constant, timing the generation of the horizontal sync signal is dependent on the magnitude of the voltage across the load resistance RL, that is; the quantity of light admitted into the photodiode PD. Voltage Vx across the load resistance RL is given by the equation : $Vx = ip \times hFE$ (amplification rate of the transistor TR1) x RL (resistance value of the load resistance) RL.

FIG. 8 which shows the timing the generation of the horizontal sync signal HL in relation with the voltage across the load resistor RL, reveals that the smaller the voltage across the load resistor RL, the more delayed is the generation of the horizontal sync signal HL. The delay time is indicated as $\Delta t$. This means that, if reflectivity is different among the reflection planes 12a to 12f of the rotary polygon mirror 12, the scanning start positions formed on the photoconductive drum 13 differ at every horizontal scanning and are out of alignment in the vertical scanning direction. In fact, it is difficult to keep the reflectivity on the reflection planes 12a to 12f constant. The difference in reflectivity tends to increase as the operation goes on because of aging, deposition of dust, and etc. Such misalignment in print starting positions results in a poor printing quality, including non-straight vertical lines, which are particularly undesirable when printing graphics.

SUMMARY OF THE INVENTION

It is an object of the present invention to provide an improved horizontal sync signal generating device for use in an optical printer wherein the print starting position can be made consistent even if the reflectivities are different among reflection planes of a rotary polygon mirror.

The foregoing object is accomplished by a device wherein the timing of generating horizontal sync signals is kept constant regardless of differing reflectivity on the reflection planes by varying a reference voltage inputted to a comparator.

More particularly, according to the invention, there is provided a horizontal sync signal generating device for use in an optical printer which comprises a photodetector for receiving light beams containing image information transmitted via a polygonal rotary member having a plurality of scanning faces, and a photoconductive member on which latent images are formed by said light beams. Starting positions of horizontal scannings on the photoconductive member for forming the latent images thereon are determined by the timing of incident light beams onto the photodetector. The improvement comprises:

means for detecting at least one characteristic of the said light beam transmitted via each scanning face of the polygonal rotary member, means for setting an associated voltage value that is dependent on the characteristic of the light beam detected by the charcteristic detecting means, and means for comparing the associated voltage value set for each scanning face by the associated voltage setting means with a voltage value that is generated by the photodetector and for generating a horizontal sync signal when the voltage value exceeds the associated voltage.

With the above constructed device, the timing at which a horizontal sync signal is generated can be kept constant in line with the vertical scanning direction, regardless of different reflectivities on the reflection planes of the polygon mirror.

Furthermore, false horizontal sync signals, which may be generated because of light noise such as ghosts, can be eliminated by adding means for supplying a blocking to the comparing means at predetermined intervals, the blocking voltage supplying means comprising means for maintaining the blocking voltage at a level exceeding a possible maximum voltage output from the photodetector upon receipt of the light beams, thereby precluding irregularities in print starting positions.

These and other objects, features and advantages of the present invention may be readily understood with reference to the following descriptions of preferred embodiments of the invention, taken together with the accompanying drawings.

DESCRIPTION OF THE ACCOMPANYING DRAWINGS

DESCRIPTION OF THE PREFERRED EMBODIMENTS

The preferred embodiments of the invention are now described with reference to the accompanying drawings.

Figure 1:
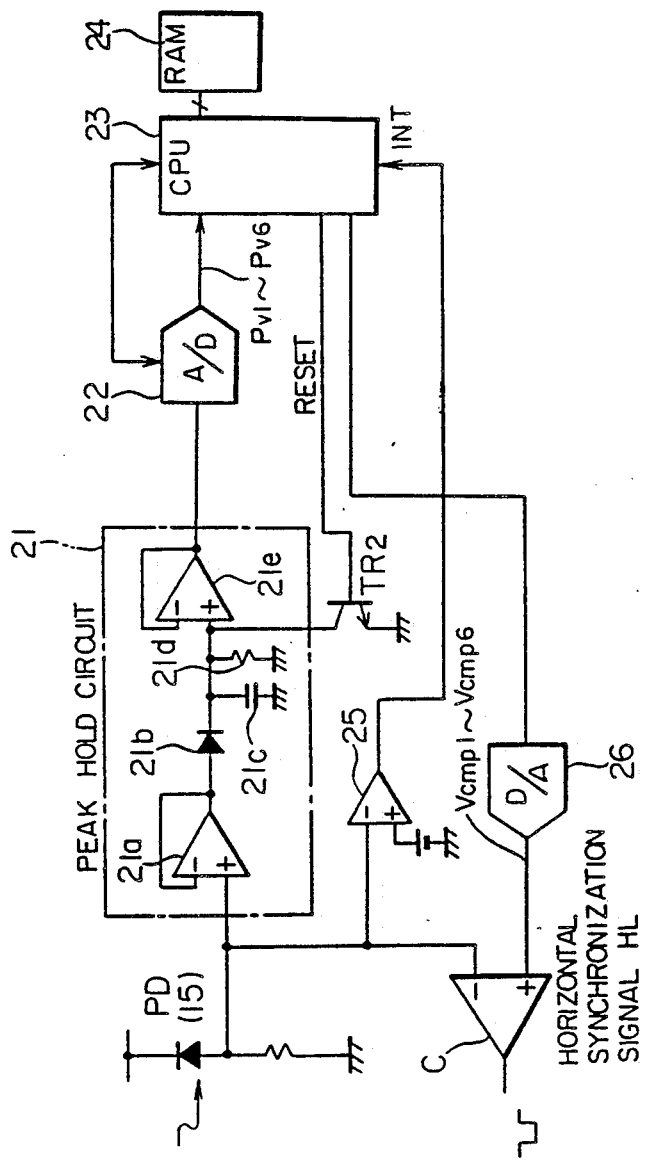
FIG. 1 shows a circuit diagram of a horizontal sync signal generating device of a laser beam printer embodying the invention.
Figure 7:
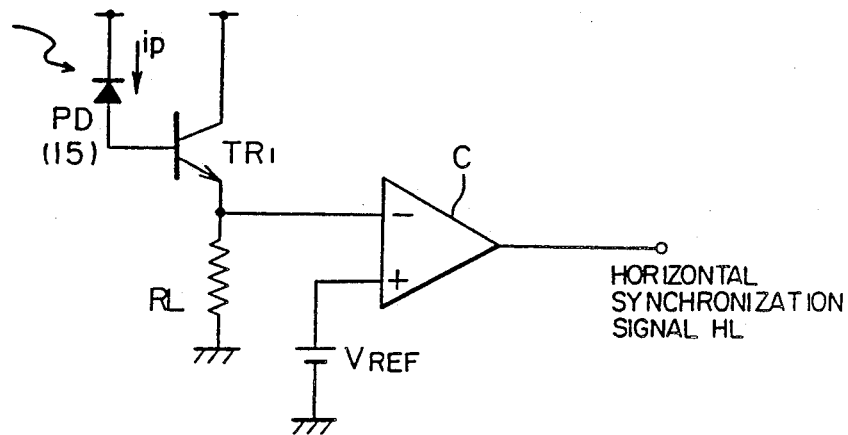
FIG. 7 shows a circuit diagram of a prior art horizontal sync signal generating device.
Figure 8:
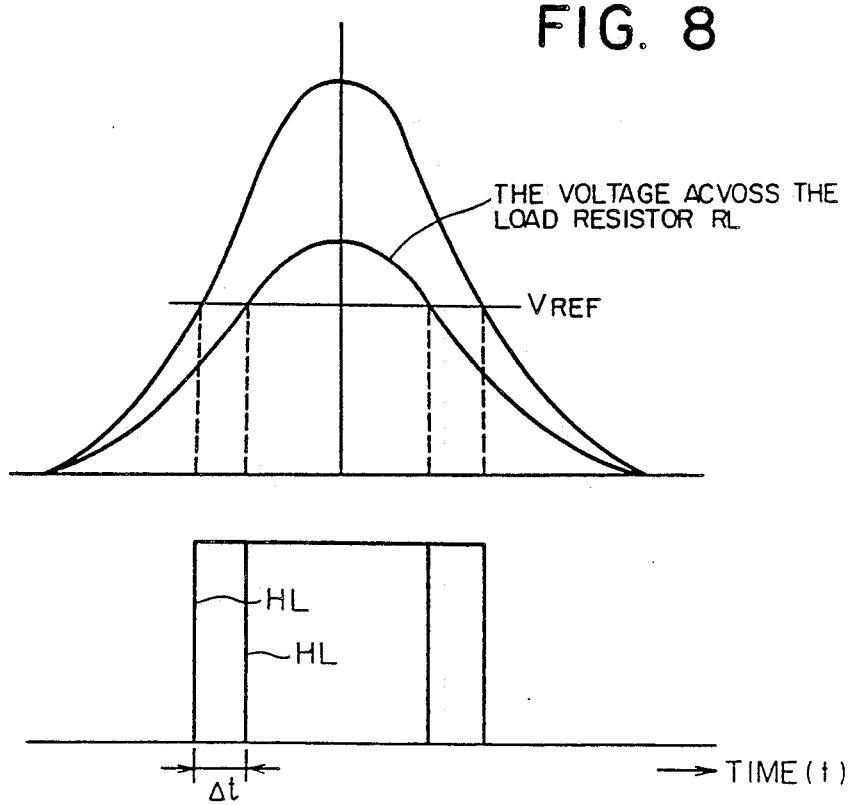
FIG. 8 is a graph showing a deviation between the magnitude of reflections and the timing for generating horizontal sync signals.

FIG. 1 shows a diagramatic view of the horizontal sync signal generating device for the LBP embodying the invention, wherein a photodiode PD and a comparator C are identical with those used in the prior art device illustrated in FIG. 7. In this device, however, the output of the photodiode PD is connected to a peak hold circuit 21 and a second comparator 25, as well as the comparator C.

The peak hold circuit 21 comprises a capacitor 21c charged to a peak value Pv which corresponds to a maximum quantity of light entered onto the photodiode PD, a diode 21b for preventing the counter flow of the electric current and a resistor 21d, at the input and output sides of which a pair of buffers 21a and 21e are arranged.

The output of the peak hold circuit 21 is connected to a CPU (Central Processing Unit) 23 via an A/D converter 22 so that the obtained peak value Pv is fed to the CPU 23 after being converted to a corresponding digital signal by the A/D converter 22. The CPU 23 stores the digital information corresponding to the peak value Pv in a RAM (Random Access Memory) 24. The output of the capacitor 21c in the peak hold circuit 21 is also connected to a transistor TR2 so that, when the transistor TR2 is turned on, the capacitor 21c is discharged so as to make it possible to charge and retain the peak value Pv of the next beam which is reflected on the next reflection plane of the polygonal mirror 12.

The output of the photodiode PD is fed to the second comparator 25 that is used for generating an output signal when the voltage level inputted into the second comparator 25 is higher than a predetermined level voltage. The generated signal is fed to the CPU 23, which is recognized as an interruption signal INT by the CPU 23. The predetermined voltage level to be compared with the input level has been set to be lower than the possible level of the output of the photodiode PD generated when the photodiode PD receives the reflected beam from the polygonal mirror 12.

When the interruption signal INT is received from the second comparator 25, the CPU 23 interrupts the routine processings for the LBP and executes the subroutine shown in FIG. 4, which will be explained later to store a peak value Pv1–Pv6 detected by the peak hold circuit 21 in the RAM 24 for each of reflection planes 12a through 12b of the rotary polygonal mirror 12.

The comparator C generates the horizontal sync signals, as the prior art device illustrated in FIG. 7. An associated voltage Vcmp is fed to the comparator C which is not a predetermined voltage, but rather varies depending upon the reflection rate of each reflection plane 12a through 12f of the polygonal mirror 12. In other words, the comparator C is connected to the CPU 23 via a D/A converter 26 and the associated voltage Vcmp is varied based upon the signals fed from the CPU 23 through the D/A converter 26.

Figure 2:
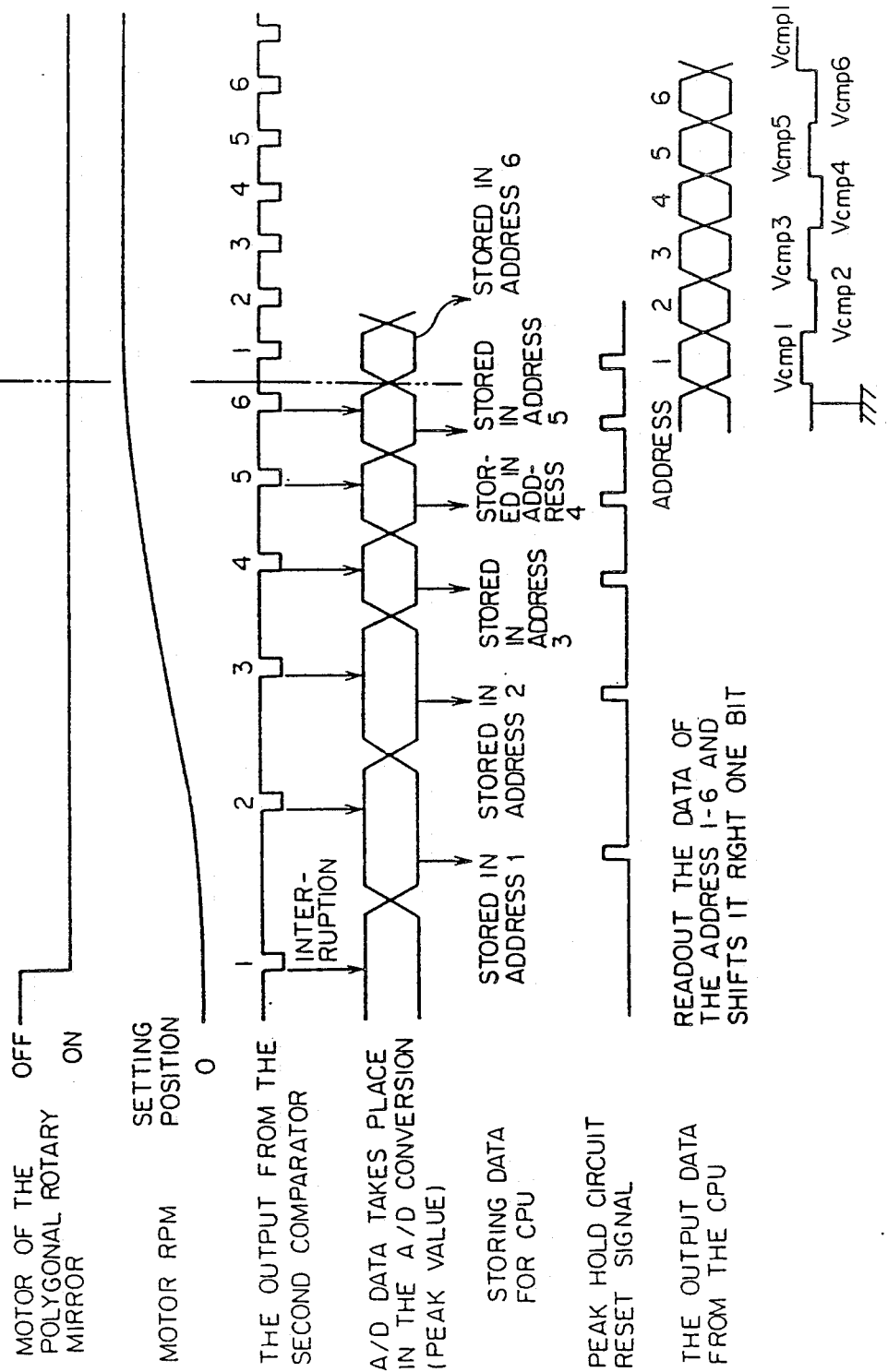
FIG. 2 is a timing chart illustrating an example of operation in the device shown in FIG. 1.
Figure 3:
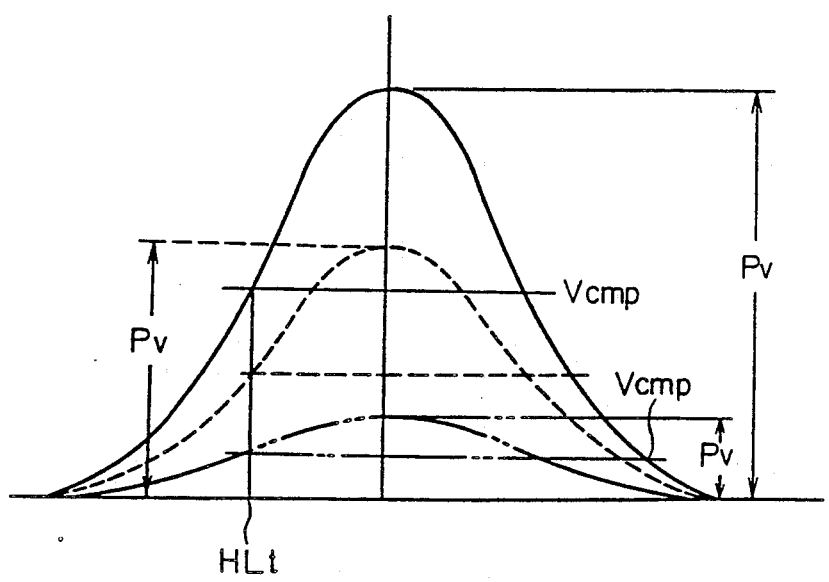
FIG. 3 is a graph of a Gaussian distrubution indicating a peak value of a light beam and the magnitude of an associated voltage determined in dependence on the peak value.
Figure 4:
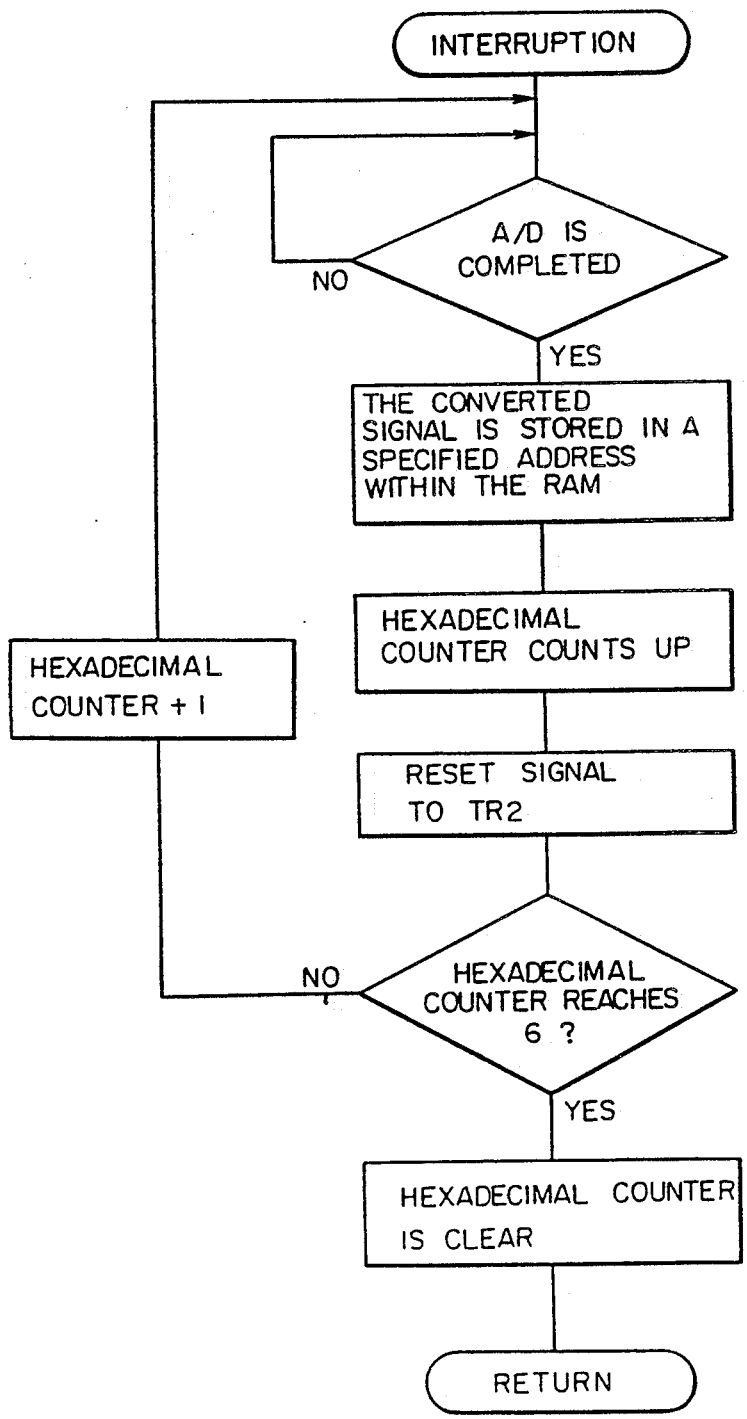
FIG. 4 is a flow chart showing a subroutine for storing the peak value of each reflection plane of a polygonal mirror.

The operation of the above constructed horizontal sync signal generating device is explained in conjunction with FIGS. 2 through 4.

The above device can be operated in a single rotation of the rotary polygonal mirror 12 before starting the main operation of the LBP. The timing for operating the device can be arbitrarily selected, so long as the polygonal mirror 12 is rotating and the semiconductor laser 11 is stably projecting the laser beam, at such time as immediately before starting the printing by the LBP.

FIG. 2 is a timing chart illustrating the steps to operate the above device. When a motor, not shown, for polygonal the rotary mirror 12 is turned on, the motor rpm gradually increases and reaches its stabilized state in about 10 seconds. This length of time is utilized to measure the reflectivity on each reflection plane 12a through 12f of the polygonal mirror 12. That is, when the polygonal mirror 12 begins to rotate, photodiode PD receives the reflected beam from any one of the reflection planes 12a to 12f of the polygonal mirror 12, regardless of the rotary speed of the mirror 12. The voltage corresponding to this reflected beam is fed to the peak hold circuit 21, as well as to the second comparator 25. The output from the second comparator 25 causes the interruption in the CPU 23.

Upon receipt of the interruption signal INT from the second comparator 25, the CPU 23 executes the subroutine illustrated in FIG. 4 for storing in the RAM 24 the peak value Pv1–Pv6 held in the capacitor 21c of the peak hold circuit 21. That is, the CPU 23 orders the A/D converter 22 to input the voltage (peak value Pv1) charged in the capacitor 21c and to convert it to a digital representation. This order is fed to the A/D converter 22 with a certain delay from the receipt of the interruption signal INT for taking a time during which the capacitor 21c accurately charges the voltage corresponding to the maximum quantity of the light entered into the photodiode PD. After confirming the completion of the A/D convertion in the A/D converter 22, the CPU 23 stores the converted data of the peak value Pv1 in the address 1 of the RAM 24 (see FIG. 2). When the peak value Pv1 for one of the reflection planes 12a to 12f is stored, the CPU 23 feeds a RESET signal to turn on the transistor TR2. This causes the capacitor 21c of the peak hold circuit 21 to be discharged so that the circuit 21 is ready for storing the peak value Pv2 of the next reflection plane.

The above steps are repeatedly executed upon receipt of the interruption signal INT until a hexadecimal counter, not shown, counts up to six (6) so that all the peak values Pv1–Pv6 for the reflection planes 12a through 12f are all stored in the specified addresses within the RAM 24. However, once the peak value Pv1–Pv6 for each of reflection planes 12a through 12f is completely stored, the CPU 23 ignores the input signal from the second comparator 25 as the interruption signal INT but utilizes it as a timing signal for calculating a data to be fed to the D/A converter 26 to control the associated voltage Vcmp1–Vcmp6 in the comparator C.

The calculation by the CPU 23 is accomplished, in this embodiment, by multiplying the peak value Pv by $\frac{1}{2}$, since the laser radiation curve approximately forms a Gaussian distribution. In FIG. 3, which illustrates Gaussian distribution curves, assuming the result of multiplying the peak value Pv by $\frac{1}{2}$ as the associated voltage Vcmp, the horizontal timing HLt at which the voltage Vcmp crosses the Gaussian curve (that is, the timing at which the horizontal sync signal HL is generated) is kept constant regardless of the level of the peak value Pv. This relationship applies to any case where the peak value Pv is divided by any integer, except for the top and bottom area of the Gaussian curve. That is, dividing by 2 is particularly chosen because it enables the use of the middle area of the Gaussian curve, where the curve section approximates linearity and also allows such simple operation as mere right shift (one bit) on a computer. If the light receiving area of the photodiode PD used as the photodetector is large relative to the laser beam diameter, photodiode PD is able to produce an output approximating the Gaussian distribution by providing a slit or pinhole on the light receiving area thereof.

Once the peak values Pv1–Pv6 for reflection planes 12a to 12f are stored in the RAM 24, the CPU 23 fetches the peak value Pv1–Pv6 every time it receives the output signal from the second comparator 25 with further rotation of the polygon mirror 12 and shifts it right one bit and multiplies by $\frac{1}{2}$, the result being fed to the D/A converter 26 to generate the individual associated voltage Vcmp1–Vcmp6 suitable for each reflection plane 12a through 12f of the polygonal mirror 12 on which the laser beam received by the photodiode PD is reflected.

The associated voltage Vcmp1–Vcmp6 fed to the comparator C by the D/A converter 26 is thus made dependent on the differing reflectivity of the reflection planes 12a through 12f of the polygonal mirror 12 so that the timing at which the horizontal sync signal HL is generated by the comparator C is kept constant throughout every horizontal scannings. Consequently, the start points of horizontal scannings on the photoconductor drum 13 are in alignment with one another in the vertical scanning direction, with no irregularity in beginning characters nor distorted vertical lines.

The peak value Pv1–Pv6 mentioned above stored in the RAM 24, may be replaced by digital information corresponding to the associated voltage Vcmp1–Vcmp6 after calculation; that is, the digital value obtained by shifting to the right on the computer.

Although in the described embodiment, the associated voltage Vcmp1–Vcmp6 is maintained at the value set by the D/A converter 26 between the successive receipts of the laser beams by the photodiode PD, there is some possibility that some irregular operation may occur in the device. That is, in the LBP optical system, reflections of the light may sometimes cause an unexpected light noise such as a ghost. Such light noise, when entering the photodetector 15 (photodiode PD), is likely to generate an unnecessary horizontal sync signal HL. Horizontal sync signals other than those properly generated creates irregularities in the horizontal scanning starting position on the photosensitive drum 13.

Figures 5, 6:
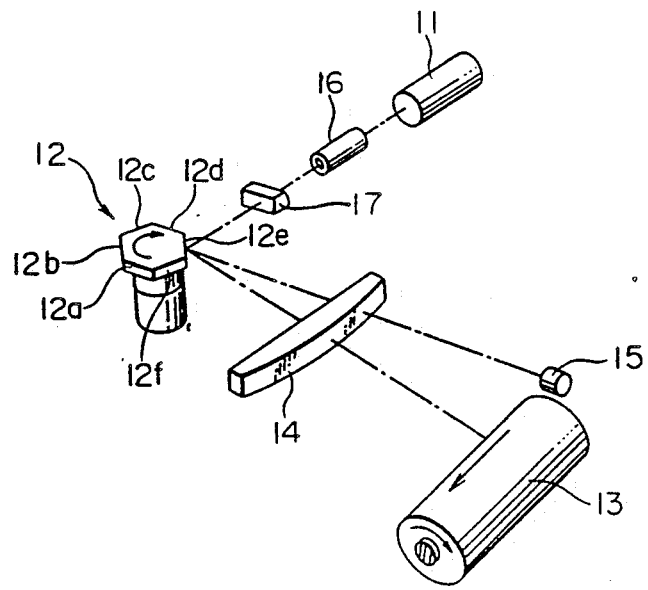
FIG. 5 is a timing chart showing an optional feature of the invention.
FIG. 6 shows a structural view of a basic optical system of a laser beam printer.

Accordingly, as illustrated in FIG. 5, the associated voltage Vcmp1–Vcmp6, calculated in the CPU 23, may be fed to the D/A converter 26 and then to the comparator C at a specified timing shortly before the timing for generating the horizontal sync signal HL, and a blocking voltage Vbck may be supplied between the successive receipts of the laser beams by the photodiode PD. The blocking voltage Vbck shall be maintained at a level exceeding a possible maximum voltage output from the photodiode PD upon recipt of the light beams. The above specified timing can be taken by the timing data stored in the RAM 24, which are obtained by calculation based upon factors such as the rotary speed of polygonal mirror 12 under the stable conditions, the length of the horizontal scanning on the drum 13 and so on. Alternatively, the timing data may be prepared by the CPU 23 by detecting and analyzing the actual data during the operations of the LBP. Such timing for feeding the associated voltage Vcmp1–Vcmp6 to the D/A converter 25 and thus the comparator C can be easily set by the CPU 23.

With this optional arrangement, the associated voltage Vcmp1–Vcmp6 is fed to the comparator C shortly before the horizontal sync signal HL is generated. Thus, all the preceding signals given to the photodetector 15 (photodiode PD) due to light noise are ignored.

Although, in the foregoing embodiment, the horizontal scanning is carried out by the polygonal rotary mirror, the principles of the present invention can be applied to other scanning systems, such as a holographic system.

What is claimed is:

1. A horizontal sync signal generating device, comprising:
   a photodetector for receiving light beams containing image information which are transmitted by a rotatable polygonal member on which latent images are adapted to be formed by said light beams;
   means for detecting a peak voltage corresponding to a maximum quantity of light entered onto said photodetector for detecting at least one characteristic representative of each of said light beams transmitted via each scanning face of said rotatable polygonal member;
   means for setting an associated voltage that is dependent upon said characteristic of each of said light beams which is detected by said peak voltage detecting means;
   means for comparing said associated voltage set for each of said scanning faces by said associated voltage setting means with a voltage value generated by said photodetector and for generating a horizontal sync signal when said voltage attains a predetermined relationship with respect to said associated voltage; and
   means for selectively preventing said comparing means from generating any output signal by blocking the generation of an undesired horizontal sync signal unless said voltage attains said predetermined relationship with respect to said associated voltage during a prescribed period of time.

2. A device in accordance with claim 1, wherein said means for selectively preventing said comparing means from generating any output signal comprises supplying means for supplying a blocking voltage to said comparing means at predetermined intervals, and for maintaining said blocking voltage at a level which exceeds a maximum potential voltage output from said photodetector upon receipt of said light beams.

3. A device in accordance with claim 1, said comparing means comprising means for generating a horizontal sync signal when said voltage generated by said photodetector exceeds said associated voltage.

4. A horizontal sync signal generating device comprising:
   a photodetector for receiving light beams containing image information which are transmitted by a rotatable polygonal member having a plurality of scanning faces;
   a peak hold circuit for detecting at least one characteristic of each of said light beams which are transmitted via each scanning face of said rotatable polygonal member;
   subjecting each characteristic to a Gaussian distribution so as to obtain a reliable reference voltage for each scanning face of said rotatable polygonal member;
   means for comparing said reference voltage with a voltage generated by said photodetector, generating a horizontal sync signal when said voltage generated by said photodetector attains a predetermined relationship with respect to said reference voltage; and
   means for supplying a blocking voltage to said comparing means at predetermined intervals and for maintaining said blocking voltage at a level which exceeds a maximum potential voltage output from said photodetector upon receipt of said light beams so that said horizontal sync signal can only be generated when said predetermined relationship exists when said blocking voltage is not supplied to said comparing means.

5. The device of claim 4, said comparing means comprising means for generating a horizontal sync signal when said voltage generated by said photodetector exceeds said reference voltage.

* * * * *